Figure 1:
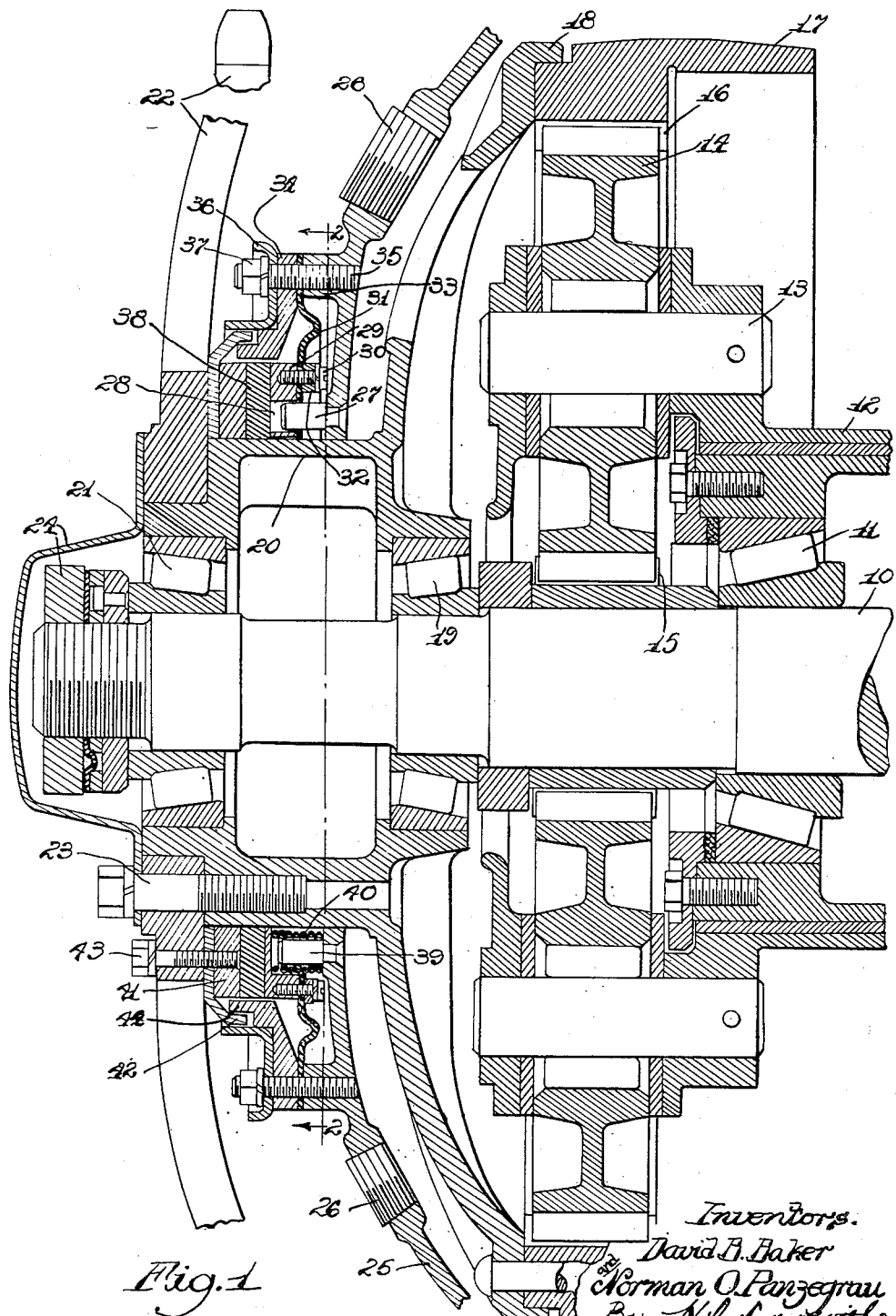

Sept. 20, 1932.  D. B. BAKER ET AL  1,878,804
OIL AND DIRT SEAL FOR GEAR CASINGS
Filed July 9, 1930  2 Sheets-Sheet 1

Inventors.
David B. Baker
Norman O. Panzegrau
By
Atty.

Sept. 20, 1932. D. B. BAKER ET AL 1,878,804
OIL AND DIRT SEAL FOR GEAR CASINGS
Filed July 9, 1930 2 Sheets-Sheet 2

Inventors.
David B. Baker
and Norman O. Panzegrau.
By H.P. Doolittle
Atty.

Patented Sept. 20, 1932

1,878,804

UNITED STATES PATENT OFFICE

DAVID B. BAKER AND NORMAN O. PANZEGRAU, OF CHICAGO, ILLINOIS, ASSIGNORS TO INTERNATIONAL HARVESTER COMPANY, A CORPORATION OF NEW JERSEY

OIL AND DIRT SEAL FOR GEAR CASINGS

Application filed July 9, 1930. Serial No. 466,868.

This invention relates to oil and dirt seals for use especially in tractors of the endless track type which employ special driving means which must be enclosed in oil retaining casings.

It has been found that such casings, which also include bearings for a drive shaft, leak oil and also, after wear takes place, permit the entry of dirt and dust particles, which is highly objectionable because of the wearing action caused by such dirt.

Accordingly, it is an object of this invention to provide an improved sealing means for transmission casings for use in tractors of the type mentioned, which seal will effectively function to prevent oil leakage from the enclosed casings and also prevent ingress of dirt and dust particles.

Another object is to provide a seal of the kind mentioned which will have a floating or following action, so that any spaces existing between the parts will be thoroughly sealed to prevent ingress of dirt or egress of oil, relative movement in any diretcion between the transmission parts takes place in operation.

Other objects will be apparent to those skilled in this art as the disclosure continues.

These desirable objects may be achieved in one form by the example of the structure herein selected for purposes of illustration.

Figure 2:
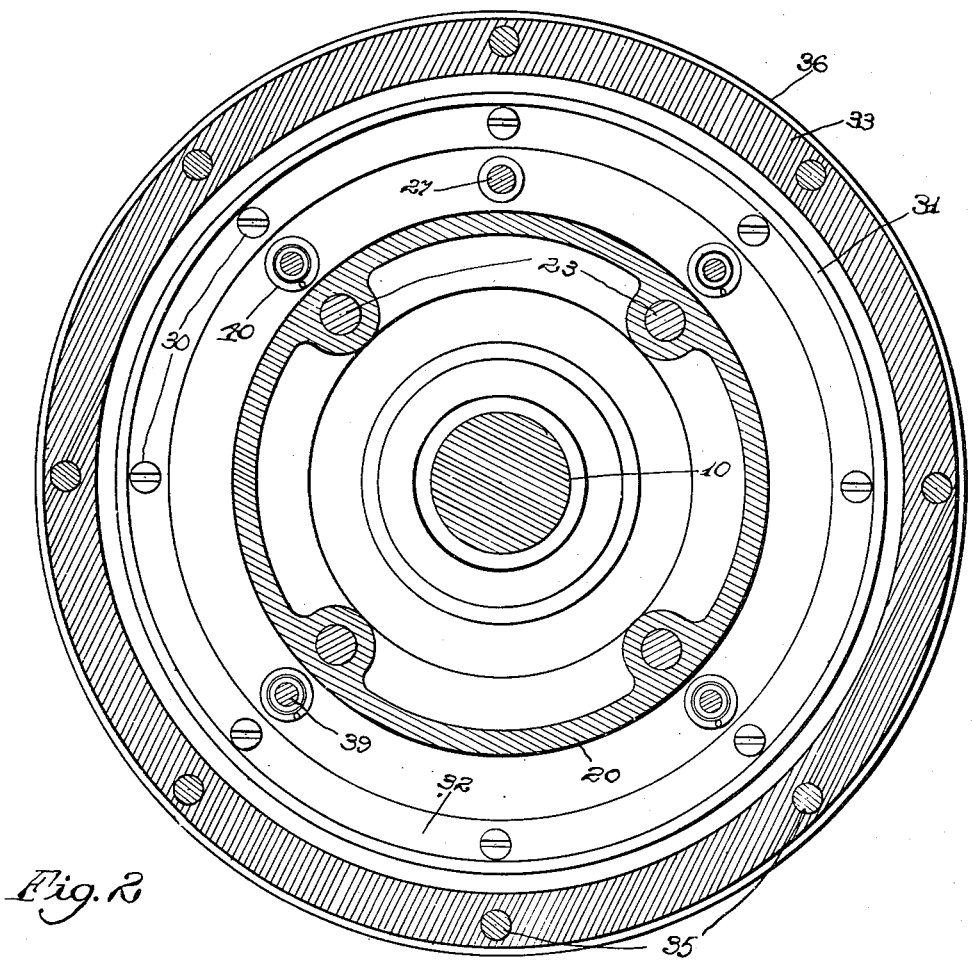

In the drawings:

Figure 1 is a plan sectional view through a part of the driving gear transmission of an endless track type tractor; and, Figure 2 is a sectional view, as seen along the line 2—2, looking in the direction of the arrows.

A tractor drive shaft is shown at 10, which carries a tapered roller bearing 11, upon which is rotatably carried a planet gear carrier 12, said carrier including pins 13 on which are journaled planet gears 14 of a planet gear set, said planet gears 14 being in mesh with a center spur gear 15 made fast to the shaft 10. The gears 14 in turn drive an internal ring gear 16 formed with a brake flange 17, said part 17 having secured thereto a cap plate 18, which is journaled on a tapered roller bearing 19 carried on an extension of the shaft 10, as shown.

The cap 18, which rotates with the part 17, includes an integrally formed, enlarged, axially extending hub part 20, the outer end of which is carried on a tapered bearing 21, said hub 20 carrying the usual large drive sprocket wheel 22, which is securely fastened to said hub 20 by bolts 23. A nut and cap assembly 24 holds the parts together. It will be understood that the sprocket wheel 22 drives the track chain (not shown) of the tractor and that this sprocket 22 turns with the cap plate 18 and the hub 20 formed therewith.

The planet gear mechanism is enclosed by a non-rotatable casing 25 provided with oil filler plugs 26, so that the casing 25 can be filled with oil. This casing surrounds the hub 20 of the rotatable part 18 and, as the hub 20, therefore, turns in the casing 25, the problem immediately exists of providing an effective seal between the stationary and rotating parts, to exclude dirt and prevent oil leakage. In solving this problem, applicants provide the following construction.

The outer face of the cap 25 carries one or more studs 27 which fit loosely into openings 28 in an inner pressure plate 29. This annular pressure plate 29, which encircles the hub 20, has made fast thereto by screws 30 a flexible diaphragm 31, there being an oil seal diaphragm ring 32 provided between the diaphragm and the screw heads 30. The outer periphery of this diaphragm 31 is clamped against an annular ring or shoulder 33 extending from the casing 25 by means of an oil guard ring 34. One or more bolts 35 project from the casing 25, said bolts passing through the diaphragm 31, guard ring 34, and an annular shield member 36, with nuts 37 provided on the bolts 35 to draw and tighten the assembly of seal parts together.

The inner pressure plate 29 abuts an annular leather oil seal packing ring 38, there being other studs 39 carried on the outer face of the casing 25, which serve as centering pins for a pressure means in the form of coil springs 40, which act to press the inner pressure plate 29 at all times against the leather packing ring 38, and, as the diaphragm 31 of flexible material is connected to the inner pressure plate 29, the diaphragm will, of course, follow with it. On the outer side of the leather packing 38 is provided an outer pressure plate 41, which abuts against a dirt deflector or slinger 42, the outer pressure plate 41 and deflector 42 being secured by one or more bolts 43 to the sprocket wheel 22 and, as a result, of course, the parts 41 and 42 must rotate with the sprocket wheel 22. It is further to be noticed that the peripheral edge of the deflector 42 is arranged inside of a flange on the shield 36 and, further, that this edge of the deflector 42 dovetails with an extension in the form of an annular shoulder 44 on the oil seal guard ring 34.

In operation, it will be seen that the oil seal mechanism comprises non-rotatable seal parts, to-wit, the diaphragm 31, the inner pressure plate 29, the guard ring 34, and the shield 36, which cooperate with rotatable seal parts connected to the sprocket wheel 22 comprising the dirt slinger or deflector 42 and the outer pressure plate 41. The leather packing 38 is just loosely disposed between rotatable and non-rotatable parts and may or may not turn. It will be understood that the yielding means in the form of a spring or springs 40 always acts to press the inner pressure plate 29 as tightly as possible against the leather packing ring 38 and against the outer pressure ring 41. Thus, very tight connections are provided, which prevent oil leakage and also prevent entry of dirt and dust particles which would quickly injure the bearings and destroy the transmission. It will also be appreciated that the diaphragm 31 follows the parts moved by the spring 40, and so at all times is effective as a seal to prevent escape of oil and ingress of dirt which might get past the dovetail joint between the dirt slinger 42 and the shoulder 44 on the oil seal guard ring 34. The seal is effective even though there may be an eccentric motion set up due to wear between the stationary and rotating members. The seal is so designed that it will operate satisfactorily under this condition, as well as a condition of a limited amount of wobble between the two parts.

From this detailed description, it must now be appreciated that an effective seal has been provided, which achieves all of the desirable objects heretofore recited.

It is the intention to cover all such immaterial variations of the form herein disclosed as do not depart from the spirit and scope of the invention as set forth in the following claims.

What is claimed as new is:

1. A seal structure between a stationary casing and a rotatable wheel having a hub journaled in the casing, an annular shoulder on the casing, said structure comprising an inner pressure plate shiftable along the hub extension inside said annular shoulder, a flexible diaphragm connected to said inner pressure plate, means to prevent turning of said pressure plate, an outer pressure plate carried by the wheel and turnable therewith, a dirt deflector between the outer pressure plate and wheel, a packing between the two plates, a guard ring radially spaced relative to the parts mentioned, a shield ring, means connecting the shield ring, guard ring, and peripheral edge of the diaphragm to the annular shoulder on the casing, and means to press the inner pressure plate and packing against the outer pressure plate, the diaphragm following with said inner pressure plate.

2. A seal structure between a stationary casing and a rotatable wheel having a hub journaled in the casing, an annular shoulder on the casing, said structure comprising an inner pressure plate shiftable along the hub extension inside said annular shoulder, a flexible diaphragm carried by said inner pressure plate, circumferentially spaced pins carried by the casing to prevent turning of said pressure plate, an outer pressure plate carried by the wheel and turnable therewith, a packing between the two plates, means to clamp the peripheral edge of the diaphragm to the annular shoulder on the casing, and means to press the inner pressure plate slidingly on the pins to force the packing against the outer pressure plate, the diaphragm following with said inner pressure plate.

3. A seal structure between a stationary casing and a rotatable wheel having a hub journaled in the casing, an annular shoulder on the casing, said structure comprising an inner pressure plate shiftable along the hub extension inside said annular shoulder, a flexible diaphragm connected to said inner pressure plate, means to prevent turning of said pressure plate, an outer pressure plate carried by the wheel and turnable therewith, a packing between the two plates, a guard ring radially spaced relative to the parts mentioned, a shield ring, means connecting the shield ring, guard ring, and peripheral edge of the diaphragm to the annular shoulder on the casing, and means serving to press the inner pressure plate and packing against the outer pressure plate, the diaphragm following with said inner pressure plate.

4. A seal structure between a stationary casing and a rotatable wheel having a hub journaled in the casing, an annular shoulder on the casing, said structure comprising an inner pressure plate shiftable along the hub extension inside said annular shoulder, a flexible diaphragm carried by said inner pressure plate, means carried by the casing to prevent turning of said pressure plate, an outer pressure plate carried by the wheel and turnable therewith, a dirt deflector between the outer pressure plate and wheel, a packing between the two plates, a shield ring, means connecting the shield ring and peripheral edge of the diaphragm to the annular shoulder on the casing, and means serving to press the inner pressure plate and packing against the outer pressure plate, the diaphragm following with said inner pressure plate.

5. A seal structure between a stationary casing and a rotatable wheel having a hub journaled in the casing, a shoulder on the casing, said structure comprising an inner pressure plate shiftable along the hub extension inside said annular shoulder, a flexible diaphragm carried by said inner pressure plate, circumferentially spaced pins carried on the casing to prevent turning of said pressure plate, an outer pressure plate carried by the wheel and turnable therewith, a dirt deflector between the outer pressure plate and wheel, a packing between the two plates, a ring radially spaced relative to the parts mentioned, means connecting the ring and peripheral edge of the diaphragm to the annular shoulder on the casing, and means serving to press the inner pressure plate slidingly on the pins with the packing against the outer pressure plate, the diaphragm following with said inner pressure plate.

6. A seal structure between the face of a stationary casing and a wheel rotatably mounted adjacent said face, circumferentially spaced pins protruding from said face toward the wheel, a pressure plate slidably carried on the pins and held against turning movement thereby, a circular diaphragm connected to move with the pressure plate, means clamping the periphery of the diaphragm, a packing slidingly carried adjacent the pressure plate, and springs for urging the plate and packing toward the wheel.

7. A seal structure between the face of a stationary casing and a wheel rotatably mounted adjacent said face, circumferentially spaced pins protruding from said face toward the wheel, a pressure plate slidably carried on the pins and held against turning movement thereby, a circular diaphragm connected to move with the pressure plate, means clamping the periphery of the diaphragm, a pressure receiving plate rotatable with the wheel, a packing loosely carried between the two plates, and circumferentially spaced springs for urging the pressure plate to press the packing against the pressure receiving plate.

8. A seal structure between the face of a stationary casing and a wheel rotatably mounted adjacent said face, circumferentially spaced pins protruding from said face toward the wheel, a pressure plate slidably carried on the pins and held against turning movement thereby, a circular diaphragm connected to move with the pressure plate, means clamping the periphery of the diaphragm, a packing slidingly carried adjacent the pressure plate, and a spring encircling each pin compressed between the said face and pressure plate for urging the plate and packing toward the wheel.

In testimony whereof we affix our signatures.

DAVID B. BAKER.
NORMAN O. PANZEGRAU.